United States Patent
Souza et al.

(10) Patent No.: US 9,313,268 B2
(45) Date of Patent: Apr. 12, 2016

(54) METHODS AND ARRANGEMENTS FOR PRIORITIZATION IN A PEER-TO-PEER NETWORK

(75) Inventors: Victor Souza, Solna (SE); Tereza Carvalho, Sao Paulo (BR); Ayodele Damola, Solna (SE); Diego Gallo, São Paulo (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 320 days.

(21) Appl. No.: 13/254,374

(22) PCT Filed: Mar. 3, 2009

(86) PCT No.: PCT/SE2009/050226
§ 371 (c)(1),
(2), (4) Date: Sep. 1, 2011

(87) PCT Pub. No.: WO2010/101496
PCT Pub. Date: Sep. 10, 2010

(65) Prior Publication Data
US 2012/0030303 A1  Feb. 2, 2012

(51) Int. Cl.
G06F 15/16 (2006.01)
H04L 29/08 (2006.01)
H04L 29/06 (2006.01)

(52) U.S. Cl.
CPC .......... *H04L 67/104* (2013.01); *H04L 29/06* (2013.01); *H04L 29/08072* (2013.01); *H04L 65/80* (2013.01); *H04L 67/322* (2013.01); *H04L 65/4084* (2013.01)

(58) Field of Classification Search
CPC .................. H04L 29/06; H04L 29/08072
USPC .......... 709/205, 227, 231, 224, 228
See application file for complete search history.

(56) References Cited

U.S. PATENT DOCUMENTS

| | | | | |
|---|---|---|---|---|
| 7,991,906 | B2 * | 8/2011 | Ng et al. | 709/231 |
| 8,082,358 | B2 * | 12/2011 | Wang et al. | 709/232 |
| 8,350,887 | B2 * | 1/2013 | Bruce et al. | 348/14.01 |
| 2003/0028777 | A1 | 2/2003 | Hennessey et al. | |
| 2006/0153201 | A1 | 7/2006 | Hepper et al. | |
| 2008/0098123 | A1 | 4/2008 | Chou et al. | |
| 2008/0109839 | A1 * | 5/2008 | Bruce et al. | 725/25 |
| 2010/0014613 | A1 * | 1/2010 | Bruckmann et al. | 375/322 |
| 2010/0082838 | A1 * | 4/2010 | Wang et al. | 709/233 |

FOREIGN PATENT DOCUMENTS

WO  WO 2005/062566 A1  7/2005

OTHER PUBLICATIONS

Yang Guo et al: "Supporting VCR Operation in a Mesh-Based P2P VoD System" Consumer Communications and Networking Conference, 2008. CCNC 2008. 5th IEEE, IEEE CCP, Piscataway, NJ, USA Jan. 1, 2008, XP031211916.
Kondou, et al. Sep. 13, 2007. V 107. No. 221.

* cited by examiner

*Primary Examiner* — Khanh Dinh

(57) ABSTRACT

The present invention relates to nodes and methods for use in connection with a peer-to-peer network for sharing of data content. A priority mechanism is introduced by means of which a serving peer may select which requesting peers to serve based on their need for data content in terms of the degree of urgency. A requesting peer may include an urgency indicator in a request for data content, which for instance may be the amount of buffered data available for playback in a video buffer. The serving peer may then extract the urgency indicator from the request and apply a priority mechanism which uses the urgency indicator to select which peers to upload data content to.

9 Claims, 4 Drawing Sheets

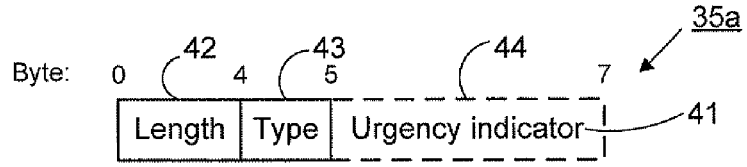
Fig. 4a
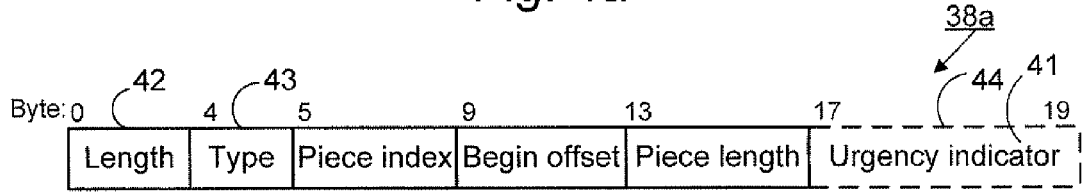
Fig. 4b
```
Every 10 seconds do
    Sort interestedPeers by buffer emptiness (lowest
buffered amount first)
    Get top 3 from this list
        For each of them
            Unchoke if choked
    Choke all others (if any other was unchoked)
Done
```
Fig. 4c
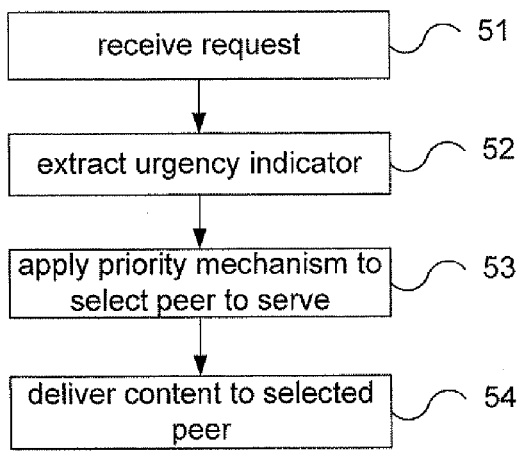
Fig. 5

METHODS AND ARRANGEMENTS FOR PRIORITIZATION IN A PEER-TO-PEER NETWORK

TECHNICAL FIELD

The present invention relates to methods and arrangements to be used in peer-to-peer (or P2P) networks, and more particularly to methods and arrangements to support prioritization in P2P networks.

BACKGROUND

In P2P computer networks peers nodes (or peers) cooperate to deliver data content to one another. The diverse connectivity and the cumulative bandwidth of the peers is e.g. used for sharing data content such as files containing audio, video, data or anything in digital format, telephony traffic, video streaming or video download. A P2P network will in many cases provide a much more efficient distribution of the data content than a hierarchical network topology with a relatively low number of centralized servicers providing data content to end nodes. In a pure P2P network there is no notion of clients or servers but only of equal peers. There are however many types of hybrid P2P networks which combine a client-server structure with the P2P structure since different network structures may be preferred for different types of tasks. Hereinafter the term P2P network is intended to encompass pure P2P networks as well as hybrid P2P networks.

There are a number of different protocols that may be used for P2P communication such as BitTorrent, Gnutella, CAN, FastTrack, and JXTA. The BitTorrent protocol is one of the most widely used P2P protocols and is described in "The BitTorrent Protocol Specification", version 11031, by Cohen, Bram, last edited Feb. 28, 2008, available on "http://www-.bittorrent.org/beps/bep 0003.html".

The BitTorrent protocol, as well as many other P2P protocols, was initially designed to allow file sharing over a P2P overlay network. In case of file sharing a user wants to have a file downloaded as fast as possible and it is usually of little consequence if the end of the file is downloaded before the beginning of the file.

As video on demand (VoD) and live streaming P2P systems are becoming popular nowadays, it is of interest to modify the P2P protocols for file sharing, such as BitTorrent, to also be able to handle these popular services. However, in the case of VoD or video streaming there are other factors to consider than in the case of file sharing. In the VoD case the user wants to have the beginning of the file downloaded first, in order to start the playback of the content. Thereafter the user wants the following part of the content and so on. Thus, the download of the content is more or less sequential, with some degree of freedom. For a user of VoD service the start-up delay is an important part of the Quality of Experience (QoE). The start-up delay is the time it takes from the start of the download of the video file until the playback of that file starts. The continuity of the VoD service is also important. The playback of the video file can start before the entire file is downloaded as long as the first part or parts are available. However, it is important that a later part of the video file has been downloaded before the playback point reaches that later part otherwise the video will freeze. Other examples of applications that may place similar demands on the download of content as VoD are audio and video streaming, gaming and in some cases software updates.

The original BitTorrent protocol uses the so called tit-for-tat approach. The tit-for-tat approach is an incentive algorithm that allows peers that contribute more to download faster. A serving peer, i.e. a peer that has data content which it allows other interested peers, requesting peers, to download will give priority to those requesting peers that have uploaded the most to the serving peer. So the tit-for-tat algorithm has the idea of being fair since you give more priority to the peers that upload the most to you. On top of that, from time to time the algorithm gives the chance to someone not uploading to you, allowing peers that have no content to start obtaining content and sharing. The tit-for-tat approach was also originally developed for file sharing and is not optimized for services such as VoD due to differing demands on the execution of the download as discussed above.

A problem with prior art mechanisms for P2P sharing is therefore that they are designed for the case of file sharing and not for other types of services such as VoD, progressive download, and audio and video streaming.

SUMMARY

From the above discussion of prior art it is clear that there is a need for alternative methods and arrangements for P2P sharing which are adapted to at least some of the demands of e.g. VoD and audio and video streaming. An object of the present invention is to provide methods and arrangements that allow for more efficient sharing of data content in a P2P network in the case of services other than file sharing The above stated object is achieved by means of methods, network nodes and an Operation and Management system according to the independent claims.

A first embodiment of the present invention provides a method in a network node that comprises a client application. The client application acts as a serving peer of a peer-to-peer network for sharing of data content. In the method at least one request for data content is received from a number of requesting peers. From the request(s) an urgency indicator is extracted. The urgency indicator indicates the requesting peer's need for the data content in terms of the degree of urgency. The requested data content is then delivered to the requesting peers, but a priority mechanism is applied to the delivery. The priority mechanism implies that the urgency indicator is used for determining which of the requesting peers to serve.

A second embodiment of the present invention also provides a method in a network node that comprises a client application. However, according to the second embodiment the client application acts as a requesting peer of a peer-to-peer network for sharing of data content. In the method a request for data content is sent to a serving peer. An urgency indicator is included in the request. The method also includes determining this urgency indicator. The urgency indicator indicates the requesting peer's need for the data content in terms of the degree of urgency.

A third embodiment of the present invention provides a network node that comprises a client application. The client application is adapted to act as a serving peer of a peer-to-peer network for sharing of data content. The network node is arranged to receive at least one request for data content from a number of requesting peers and to deliver the requested data content to the requesting peers. Furthermore the client application is arranged to extract an urgency indicator the request. The urgency indicator indicates the requesting peer's need for the data content in terms of the degree of urgency. The client application comprises a priority mechanism. The priority mechanism is adapted for controlling the delivery of the requested data content by using the urgency indicator for determining which of the requesting peers to serve.

A fourth embodiment of the present invention provides a network node that comprises a client application. The client application is adapted to act as a requesting peer of a peer-to-peer network for sharing of data content. The network node is arranged to send a request for data content to a serving peer. The client application is arranged to include an urgency indicator in the request. The client application is also arranged to determine the urgency indicator. The urgency indicator indicates the requesting peer's need for the data content in terms of the degree of urgency.

A fifth embodiment of the present invention provides an Operation and Management system for managing a peer-to-peer network for sharing of data content. The Operation and Management system is arranged to receive at least one message from a requesting peer in the peer-to-peer network. The requesting peer is requesting data content from a serving peer in the peer-to-peer network. The Operation and Management system is arranged to extract an urgency indicator from the message received from the requesting peer. The urgency indicator indicates the requesting peer's need for the data content, which it is requesting from the serving peer, in terms of the degree of urgency. The Operation and Management system is further arranged to use the urgency indicator for making decisions regarding the management of the peer-to-peer network.

An advantage of embodiments of the present invention is that the risk for QoE degradation can be reduced by providing means for distributing data content efficiently according to the needs of the requesting peers. Thereby it is possible to keep more satisfied requesting peers (high level of QoE) and users content than with solutions according to prior art.

Another advantage of embodiments of the present invention is that so-called seek operations in a video will start faster. A seek operation occurs when a user changes the playback point and initiates a jump to later in the video. This may trigger the need to urgently download a section of the video file that has not been downloaded yet. This urgent need will be considered according to embodiments of the present invention to allocate network resources (i.e. serving peers) so that quick download of the desired section can be achieved.

A further advantage of embodiments of the present invention is that system resources may be used in a more intelligent way. This is possible since embodiments of the present invention make it possible to focus the available resources to where they are needed the most at the present time. There is no point in keeping networks resources busy with uploads of data content to peers that have no immediate need for the data if there are other peers that are in urgent need of data content. By giving priority to data content delivery to peers that are in urgent need the network resources can be used more efficiently.

Yet another advantage of an embodiment of the present invention is that it provides a tool for managing bottlenecks and traffic congestion in a peer-to-peer network for sharing data content. This can be achieved by providing an Operation and Management system with information regarding the need for data content of different peers so that peers that have no urgent need for data content can be requested to stop requesting data content in a case of traffic congestion.

Further advantages and features of embodiments of the present invention will become apparent when reading the following detailed description in conjunction with the drawings.

BRIEF DESCRIPTION OF THE DRAWINGS

FIGS. 4a and 4b are schematic block diagrams of messages which a requesting peer may send according to an embodiment of the present invention.

FIG. 4c is a schematic diagram illustrating a modified unchoke mechanism of the BitTorrent protocol expressed in pseudo code according to an embodiment of the present invention.

FIG. 5 is a flow chart illustrating an embodiment of the present invention, which is a method in a network node with a client application acting as a serving peer.

DETAILED DESCRIPTION

Figure 1:
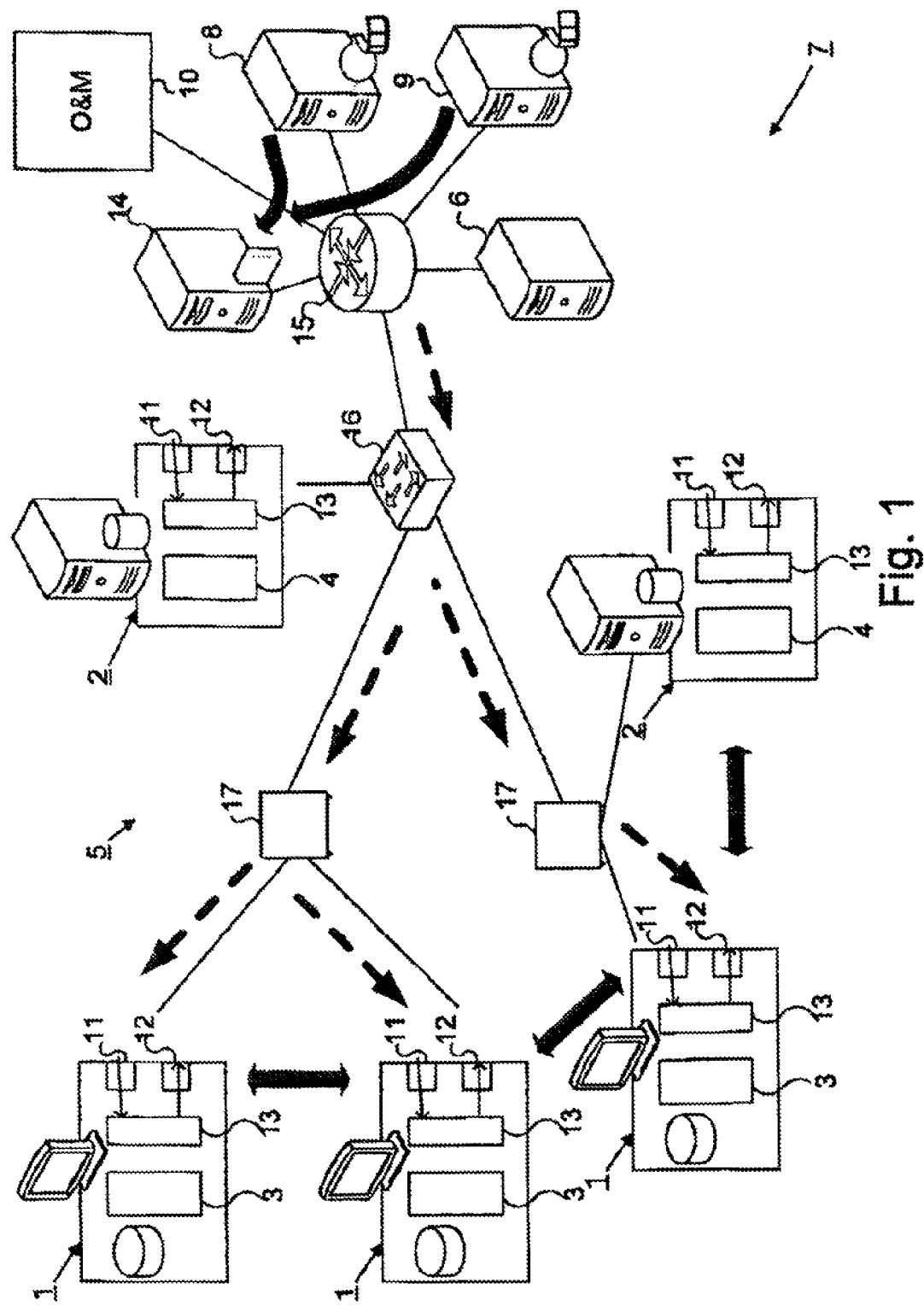
FIG. 1 is a schematic block diagram illustrating a system for delivering media services using P2P communication in which embodiments of the present invention may be implemented.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 illustrates an example of a system 7 for delivering media services to client end nodes 1, in which embodiments of the present invention may be implemented. The client end nodes are able to communicate with head end servers, in this example a VoD server 8 and a live streaming server 9 via network 5. The network 5 is in this case a hybrid P2P network which allows the client end nodes 1 to communicate with the head end servers 8 and 9 according to a client-server model while it also allows the client end nodes 1 to communicate with each other or with other nodes in the network such as cache servers 2 according to a P2P model. In FIG. 1 solid bold double arrows are used to schematically indicate P2P communication between nodes, while solid bold single arrows indicate unicast communications traffic and dashed single arrows indicate multicast communications traffic.

In the scenario illustrated in FIG. 1 the network 5 may be a managed network of an operator that e.g. provides TV and VoD services to the users of the client end nodes 1. TV services may be provided by means of multicast transmissions from the live streaming server 9 to the client end nodes 1. VoD services may be provided to the client end nodes by means of unicast transmissions from the VoD server 8. In the system 7 of FIG. 1 it is also possible for the client end nodes to obtain video files or sections of video files from other client end nodes or from the cache servers 2 by means of P2P communication. From the operator's point of view it is preferable that the client end node 1 obtains a requested video file by means of P2P communication since unicast communication between the client end node 1 and the VoD server 8 is more expensive in terms of required network resources than P2P communication.

The client end nodes 1 may for instance be set-top-boxes with storage capabilities, computers or some other type of electronic equipment comprising an input unit 11, an output unit 12 and a processing unit 13 which provide telecommunication capabilities. The cache servers 2 could e.g. be used to cache popular content that e.g. relates to the mostly watched TV programs to thereby assist in providing a time-shift-TV service, i.e. a service by which a user can request to watch a TV program at a time of choice after the actual broadcasting time of that TV program. The cache servers 2 also comprise an input unit 11, an output unit 12 and a processing unit 13. The client end nodes 1 and the cache servers 2 also include client applications 3 and 4 respectively. The client applications 3, 4 would normally be implemented in software, although implementations in hardware or firmware or combinations thereof are also feasible. In the system 7 of FIG. 1 the client applications 3 of the client end nodes 1 are adapted to act as both requesting and serving peers according to the P2P model for communication while the client applications 4 are adapted to act as serving peers only. The client application acts as a requesting peer when it performs operations related to requesting content to the client end node from another peer of the network. When the client application is performing operations relating to providing content to a requesting peer it is said to act as a serving peer.

FIG. 1 also illustrates that the network 5 comprises a content tracker 6, which in this case is a managed content tracker. The function of the content tracker is to keep track of where in the network different content is stored. A requesting peer can then contact the content tracker to find out from which serving peer or peers it can obtain certain pieces of content. The fact that the content tracker 6 is managed means that it is controlled by the operator in this case. Furthermore, the system 7 of FIG. 1 includes an Operation and Management (O&M) system which is arranged to perform central supervision and traffic management of the network 5. Other equipment which is schematically illustrated in the network 5 is a proxy server 14, an edge router 15, an aggregation switch 16 and access nodes 17. These different types of equipment have functions and implementations that are well known to a person skilled in the art and will therefore not be explained in detail herein.

As mentioned in the background section, prior art solutions for P2P communications may use the tit-for-tat approach. Assume for instance that a serving peer has received requests from 5 other requesting peers for a piece of content, e.g. a video chunk. The serving peer will then according to the tit-for-tat approach e.g. choose to upload to those three requesting peers that previously have uploaded the most content to the serving peer and choke the other two requesting peers (i.e. send a so-called choke message which tells the requesting peers to stop requesting content until they receive a so-called unchoke message). Suppose however that one of the choked requesting peers is in urgent need of a video chunk since its associated video buffer is running empty. If this video chunk is not obtained the user might experience a disruption of the service, i.e. the video will freeze in the screen. Suppose yet that all the other peers that are being served have buffers nearly full. According to prior art solutions this situation could thus lead to three very content users associated with the requesting peers that are being served while the users associated with the other two requesting peers might be very discontent due to a disruption of the service. However embodiments of the present invention provide a possibility to keep the users of all five requesting peers content by taking the need of the requesting peers into consideration when deciding which requesting peers to serve first. Thus, embodiments of the present invention provide a priority mechanism which can be applied to send video chunks to those peers who need them the most. To implement this priority mechanism the requesting peer could include an urgency indicator in a P2P request message for content. When receiving the request message, the serving peer may save the urgency indicator associated with the requesting peer, and use this information to sort the requesting peers to decide for which one to upload or increase the exchange rate.

The urgency indicator may comprise many different types of information according to different embodiments of the present invention. The urgency indicator may e.g. in a VoD application be information regarding how empty a video buffer of the requesting peer is, such as amount of buffered data already available for playback, an indication of remaining playback time until the buffer is empty, an indication of buffer emptiness of the coming minute of video, or a classification of level of emptiness which indicates one of a number of predefined intervals of buffered data. Irrespective of the type of information comprised in the urgency indicator it is important that it will provide some kind of measurement of the degree of urgency for content which may be interpreted by the serving peer. The serving peer can then choose to upload to the requesting peer who has indicated the highest degree of urgency first.

Figure 2A:
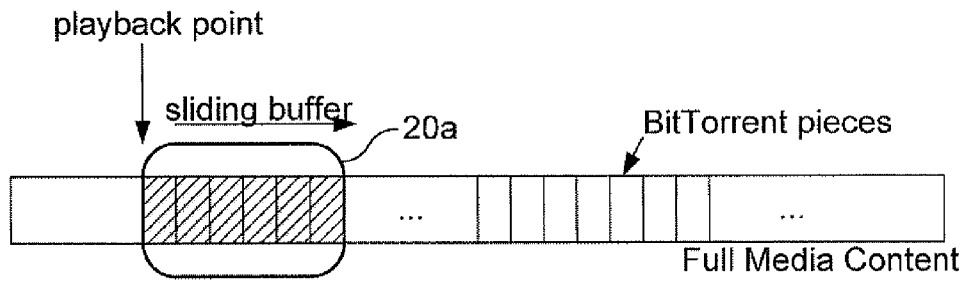
FIGS. 2a and 2b are schematic block diagrams illustrating video buffers of requesting peers which would be given low priority or high priority respectively according to embodiments of the present invention.
Figure 2B:
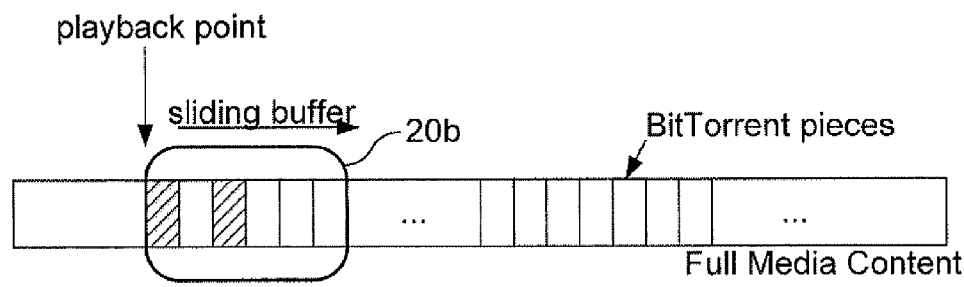

FIG. 2a and FIG. 2b are schematic illustrations of video buffers in relation to media content of two requesting peers for illustrating how the embodiments of the present invention may be used to prioritize different peers. FIG. 2a and FIG. 2b illustrate two sliding buffers 20a and 20b respectively. In the buffers 20a and 20b a dashed rectangle illustrates a video piece (in this example a so-called BitTorrent piece) that has been downloaded and is available for playback, while a white rectangle indicates a video piece that remains to be downloaded. Thus FIG. 2a illustrates a buffer 20a which is full and FIG. 2b illustrates a buffer that is close to empty. It would therefore make sense to give low priority to any upload to the requesting peer with buffer 20a while the requesting peer with buffer 20b should be given high priority since it is in more urgent need for video pieces. This type of prioritization is possible according to embodiments of the present invention and can avoid interruptions during the playback time when there are enough resources in the P2P network.

Figure 3:
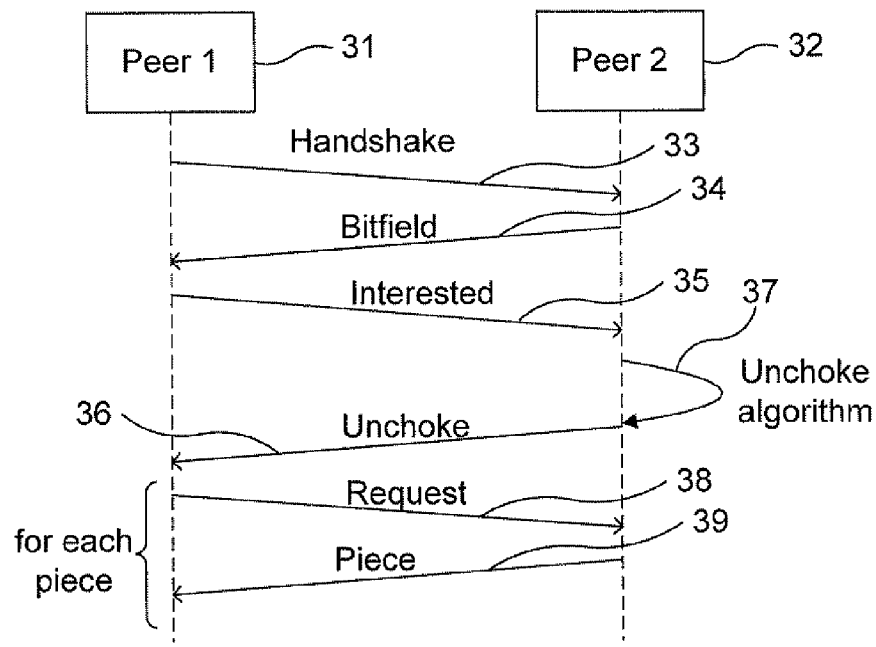
FIG. 3 is a sequence diagram illustrating messages sent between a requesting peer and a serving peer according to the BitTorrent protocol.

Next an embodiment of the present invention will be explained, which involves a modification of the original BitTorrent protocol. According to the BitTorrent protocol a peer which would like to request some content (i.e. a requesting peer) will first obtain from a tracker, such as content tracker 6 of FIG. 1, a list of other peers that have the desired content or parts of it. After that, a direct communication between the requesting peer and the peer with the content (i.e. the serving peer) would start. FIG. 3 illustrates schematically a message exchange according to the BitTorrent protocol between the requesting peer 31 and the serving peer 32. The requesting peer 31 will first send a handshake message 33 to the serving peer. The serving peer should reply with its bitfield 34, which is a set of bits representing the pieces of content that the serving peer has. Based on this information the requesting peer will send an interested message 35 in case the serving peer has some piece needed. When receiving the interested message 35 though, the serving peer will add the requesting peer in a list, together with all other peers that are interested in some data that the serving peer has, and periodically the serving peer will run an unchoke mechanism 37, unchoking some of the requesting peers. When unchoking a requesting peer the serving peer will send an unchoke message 36 which indicates to the requesting peer that it is OK to start requesting pieces of content. The requesting peer can then send a request message 38 to request a particular piece of content. The serving node will respond by sending the requested piece of content in a message 39. The requesting peer will continue to request pieces of content until it has received all the pieces of content that it was interested in from the serving peer or until it receives a choke message that indicates that it should stop requesting content until an unchoke message is received.

According to the original BitTorrent protocol the unchoke algorithm takes into account the tit-for-tat approach in which the "waiting for unchoke" peer list is sorted based on how much each requesting peer has uploaded to the serving peer, and the unchoke message is sent to a limited number of requesting peers on top of the list. In this way the requesting peers that contribute the most to a serving peer would be allowed to download from that serving peer.

According to this embodiment of the present invention the interested message 35 and the request message 38 that would be sent with the original BitTorrent protocol are modified to include the above mentioned urgency indicator. FIG. 4a and FIG. 4b illustrate schematically examples of such a modified interested message 35a and a modified request message 38a respectively. The interested message 35a includes a length field 42, a type field 43, and according to this embodiment also a field 44 comprising the urgency indicator 41, which for instance may be the buffered amount in a video buffer as discussed above. The request message 38a includes a length field 45, a type field 46, a piece index field 47, a begin offset field 48, a piece length field 49, and according to this embodiment also a field 50 comprising the urgency indicator 41.

Adding the urgency indicator 41 in the interested and request messages 35a and 38a gives the serving peer the possibility to upload for the requesting peers that are in most need for data, instead of only using the traditional tit-for-tat approach that, as explained above, is not ideal for scenarios such as P2P VoD distribution, in which the playback starts before the end of the full content download.

If we assume, for this embodiment, that the urgency indicator included in the interested message 35a and the request message 38a is the buffered amount in the video buffer of the requesting peer, then the unchoke mechanism 37 of FIG. 3 could e.g. be modified as shown in FIG. 4c. FIG. 4c is a schematic illustration of an unchoke mechanism 37a according to an embodiment of the present invention expressed in pseudo code. The unchoke mechanism will function to periodically sort all requesting peers, from which an interested message has been received (i.e. so-called interested peers) by their indicated buffer emptiness. The interested peer that has indicated the lowest buffered amount will be placed first in the list. From the list the first three interested peers are selected. The selected peers are unchoked if they are choked and all other interested peers which were not selected are choked. The unchoke mechanism 37a is of course just an example of an embodiment of the present invention. To give examples of other embodiments that are possible according to the present invention it could be mentioned that the urgency indicator may include other information than the buffered amount which indicate the need of the requesting peer in terms of the degree of urgency, the number of peers that are selected according to the unchoke mechanism is not limited to three, but could be any number that is deemed suitable for the particular implementation, and it is furthermore not necessary to apply an unchoke mechanism to implement the priority mechanism that is used to determine which requesting peer(s) to serve based on the urgency indicator, since there are other possible alternative algorithms.

In the embodiment discussed above where the urgency indicator is the buffered amount which is included in the interested and request messages 35a and 38a, the buffered amount information is the number of video blocks that the requesting peer has already downloaded but has not played yet. Using two bytes for this information is enough for informing $2^{16}$ video blocks, which would be equivalent to several hours of buffered data even for very small video block sizes like one second. On the other hand, adding 2 bytes in these messages does not generate a big overhead since it represents two bytes out of a 75 or 87 bytes packet respectively for the interested and request messages.

The embodiments of the present invention provide the requesting peer with the possibility to influence its own priority. Clearly, this is not the usual case in a P2P network because any malicious peer could obtain higher priority by misinforming other peers (i.e. tamper with the urgency indicator to indicate a higher urgency than what is true), and if all peers indicate high priority then that would result in no priority. However in many scenarios, such as the VoD scenario of FIG. 1 described above, the user gets nothing for spoofing own priority since only unneeded parts would be downloaded faster. Moreover the scenario described in connection with FIG. 1 concerns a managed media distribution service, where the client applications 3, 4 are under the control of the operator (the nodes 1 are e.g. trusted set-top-boxes).

The information contained in urgency indicator may be of interest to other parties than a serving peer in a network. If an Operation and Management (O&M) system (such as the O&M system 10 in FIG. 1) is informed of the urgency indicators it could request that a requesting peer that is not in urgent need for data to stop requesting pieces (e.g. for a predetermined amount of time) in case of network congestion in order to avoid network disruptions. This is an optional feature according to certain embodiments of the present invention and could be implemented e.g. by modifying the client application 3 to inform the O&M system when it reaches some level of low urgency below a predetermined degree, such as for example when the data for the next five minutes of video is buffered. The O&M system may be informed by a message that includes the urgency indicator of the associated peer.

FIG. 5 is a flow diagram illustrating an embodiment of a method according to an embodiment of the present invention. The method of FIG. 5 is carried out in a network node that comprises a client application that is acting as a serving peer of a P2P network. In a step 51 one or several requests for data content is received from a number of requesting peers in the P2P network. These request(s) could for instance be an interested message 35a or a request message 38a as discussed above and include an urgency indicator associated with the requesting peer. The urgency indicator is indicating the requesting peer's need for the data content in terms of the degree of urgency. In a step 52, extraction of the urgency indicator(s) from the request(s) is carried out. Then, in a step 53, a priority mechanism is applied in which the urgency indicator is used to determine which peer to serve. This step may for instance involve sorting the requesting peers according by buffer emptiness and selecting the three peers with the least amount of buffered data, as mentioned above. The delivery of data content to those peers that were selected in step 53 is carried out in a step 54.

Figure 6:
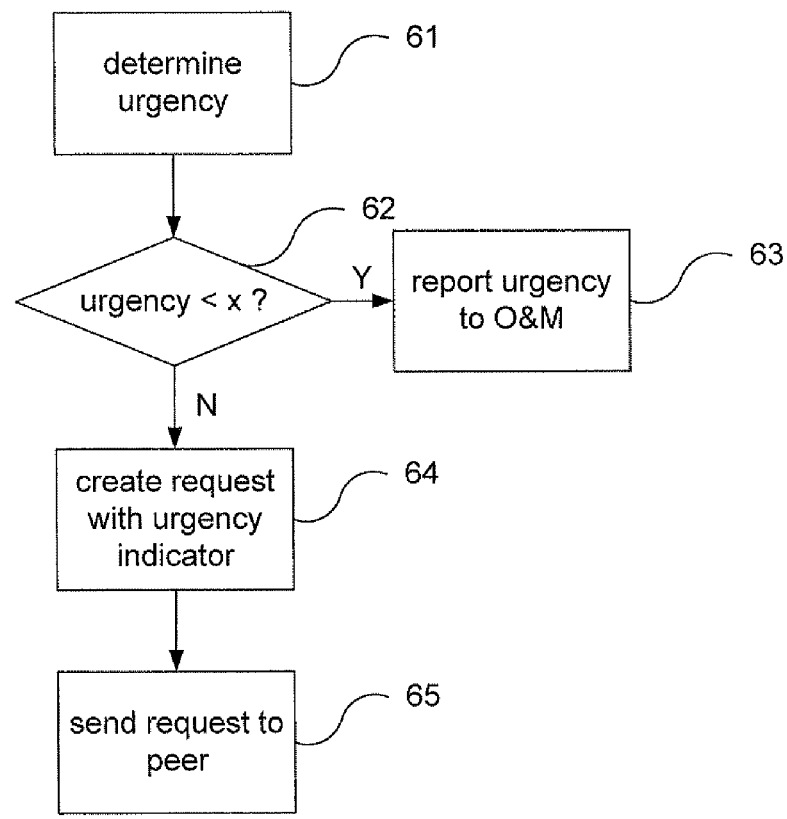
FIG. 6 is a flow chart illustrating an embodiment of the present invention, which is a method in a network node with a client application acting as a requesting peer.

FIG. 6 is a flow diagram illustrating an embodiment of a method according to another embodiment of the present invention. The method of FIG. 6 is carried out in a network node that comprises a client application that is acting as a requesting peer of a P2P network. In a step 61, prior to requesting data content from a serving peer, the urgency for the data is determined and translated into an urgency indicator. This step may for instance involve a determination of the amount of buffered data in a video buffer or an estimation of the remaining playback time for which data is available. In an optional step 62 it may be determined whether or not the urgency is below some predetermined degree x, and if this is the case the urgency may be reported to the O&M system, as discussed above, in optional step 63. Thereafter a request for data content is created and the urgency indicator is included in the request in a step 64. The request may for instance be the interested message 35a or the request message 38a. In a step 65 the request is sent to the serving peer.

Since most client applications, such as client application 3 of FIG. 1, are adapted to act both as a serving peer and a requesting peer it is possible that the method of FIG. 5 and the method of FIG. 6 are carried out simultaneously in the same node.

The present invention has been described above by means of description of embodiments of the invention. However there are many modifications that are possible as will be appreciated by the person skilled in the art. Implementation of the above mentioned methods according to embodiments of the present invention will require some adaptation of prior art network nodes for use in P2P networks. Such adaptations will usually only require adaptation of a client application such as the client applications 3 or 4 of FIG. 1. The natural choice is to adapt the client application by means of new software, although implementations in firmware, hardware or combinations thereof are also feasible. Furthermore, implementation of the optional steps 62 and 63 of FIG. 6 implies adaptation of the O&M system to extract and interpret the urgency indicator from the message from the peer and to use the urgency indicator for making network management decisions. The adaptations of the O&M system would preferably merely involve software updates.

FIG. 1 illustrates a scenario in which it may be beneficial to implement the present invention. However, there are of course many other scenarios in which embodiments of the present invention may be used. In cases of P2P distribution of data content, wherein the character of the data content is such that the order in which different pieces of the data content is downloaded matters, it is often advantageous to implement a priority mechanism according to an embodiment of the present invention. Such cases are e.g. live streaming services for distribution of audio or video content, VoD services, and in some cases downloads related to gaming or software updates. The type of information that is used as the urgency indicator will depend on the actual application scenario. Furthermore it is possible to combine priority mechanism described above according to which peers are served in order of urgency with the tit-for-tat approach. The urgency as indicated by the urgency indicator may be the primary criteria by which selected peers are sorted and the tit-for-tat approach the secondary criteria, or vice versa. Thereby, if several requesting peers have indicated the same urgency, then the serving peer may select to serve those requesting peers in urgent need of data which have uploaded the most data to the serving peer in the past.

From the description above the person skilled in the art will realize what software, firmware and/or hardware modifications are necessary and/or suitable in order to implement the different described embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a network node, the network node comprising a client application utilizing a microprocessor associated with persistent storage, and acting as a serving peer of a peer-to-peer network for sharing of data content, the method comprising:
    receiving at least one request for data content from a number of requesting peers;
    delivering the requested data content to the number of requesting peers:
    for each of the requesting peers, extracting an urgency indicator from the at least one request, the urgency indicator indicating an amount of buffered data content in a buffer for buffering data available for playback in the requesting peer; and
    applying a priority mechanism to the delivery of the requested data content, the priority mechanism sorting the requesting peers using the urgency indicators extracted from the at least one request and, based on the sorting, determining which of said number of requesting peers to serve,
    wherein the priority mechanism is applied to an unchoke mechanism which periodically:
        checks for requesting peers interested in downloading content from the serving peer;
        selects a number of the sorted requesting peers that have urgency indicators indicating the highest urgency for data;
        unchokes those selected requesting peers that are choked; and
        chokes any unchoked requesting peer which was not selected.

2. The method according to claim 1 wherein said at least one request is one of an interested message indicating that the requesting peer is interested in downloading the data content and a request message indicating a request for downloading a particular piece of the data content to the requesting peer.

3. The method according to claim 1 wherein said priority mechanism delivers the requested data content to those requesting peers with urgency indicators showing the smallest amount of buffered data.

4. The method according to claim 1, wherein said data content is one of (a) video content related to one of (i) a Video on Demand service and (ii) a streaming service, and (b) audio content related to an audio streaming service.

5. A network node arrangement comprising a client application, utilizing a microprocessor associated with persistent storage and adapted to act as a serving peer of a peer-to-peer network for sharing of data content, the network node being configured to:
    receive at least one request for data content from a number of requesting peers;
    deliver the requested data content to the number of requesting peers;
    for each of the requesting peers, extract, by the client application, an urgency indicator from the at least one request, the urgency indicator indicating an amount of buffered data content in a buffer for buffering data available for playback in the requesting peer; and
    the client application comprising a priority mechanism configured to control the delivery of the requested data content by sorting the requesting peers using the urgency indicators extracted from the at least one request and, based on the sorting, determining which of said number of requesting peers to serve,
    wherein the priority mechanism includes an unchoke mechanism, the unchoke mechanism configured to periodically:
        check for requesting peers interested in downloading content from the serving peer;

select a number of the sorted requesting peers that have urgency indicators indicating the highest urgency for data;

unchoke those selected requesting peers that are choked; and choke any unchoked requesting peer which was not selected.

6. The network node according to claim 5, wherein said priority mechanism is configured to deliver the requested data content to those requesting peers with urgency indicators showing the smallest amount of buffered data.

7. The network node according to claim 5, wherein said at least one request is one of an interested message indicating that the requesting peer is interested in downloading the data content and a request message indicating a request for downloading a particular piece of the data content to the requesting peer.

8. An Operation and Management system for managing a peer-to-peer network for sharing of data content the Operation and Management system being configured to:

receive at least one message from a number of requesting peers in the peer-to-peer network, which requesting peers are requesting data content from a serving peer in the peer-to-peer network;

for each of the requesting peers, extract an urgency indicator from the at least one message, the urgency indicator indicating the requesting peer's need for the data content, the need for the data content being expressed as a degree of urgency; and apply a priority mechanism to the delivery of the requested data content, the priority mechanism sorting the requesting peers using the urgency indicators extracted from the at least one message and, based on the sorting, determine which of said number of requesting peers to serve, wherein the priority mechanism is applied to an unchoke mechanism which periodically:

checks for requesting peers interested in downloading content from the serving peer;

selects a number of the sorted requesting peers that have urgency indicators indicating the highest urgency for data;

unchokes those selected requesting peers that are choked; and chokes any unchoked requesting peer which was not selected.

9. The Operation and Management system according to claim 8, wherein the Operation and Management system is further configured to send requests to requesting peers having reported low urgency, to stop requesting data content for a predetermined amount of time.

\* \* \* \* \*